M. E. JOLLIFFE & J. H. COWAN.
SAFETY ATTACHMENT FOR MINE ELEVATORS.
APPLICATION FILED SEPT. 5, 1908.

934,816.

Patented Sept. 21, 1909.
5 SHEETS—SHEET 1.

Morgan E. Jolliffe,
John H. Cowan,
Inventors

Witnesses
Jas. F. McCathran
J. H. Riley

By
C. J. Siggers
Attorney

M. E. JOLLIFFE & J. H. COWAN.
SAFETY ATTACHMENT FOR MINE ELEVATORS.
APPLICATION FILED SEPT. 5, 1908.

934,816.

Patented Sept. 21, 1909.
5 SHEETS—SHEET 2.

Fig. 2.

Witnesses
Jas. F. McCathran
H. F. Riley

Morgan E. Jolliffe,
John H. Cowan,
Inventors,

By C. G. Siggers
Attorney

M. E. JOLLIFFE & J. H. COWAN.
SAFETY ATTACHMENT FOR MINE ELEVATORS.
APPLICATION FILED SEPT. 5, 1908.

934,816.

Patented Sept. 21, 1909.
5 SHEETS—SHEET 4.

Morgan E. Jolliffe,
John H. Cowan,
Inventors

Witnesses

By

Attorney

M. E. JOLLIFFE & J. H. COWAN.
SAFETY ATTACHMENT FOR MINE ELEVATORS.
APPLICATION FILED SEPT. 5, 1908.

934,816.

Patented Sept. 21, 1909.
5 SHEETS—SHEET 5.

Morgan E. Jolliffe,
John H. Cowan, Inventors

Witnesses

UNITED STATES PATENT OFFICE.

MORGAN EVAN JOLLIFFE, OF UNIONTOWN, PENNSYLVANIA, AND JOHN H. COWAN, OF JEFFERSON, OHIO.

SAFETY ATTACHMENT FOR MINE-ELEVATORS.

934,816.  Specification of Letters Patent.  Patented Sept. 21, 1909.

Application filed September 5, 1908. Serial No. 451,824.

*To all whom it may concern:*

Be it known that we, MORGAN EVAN JOLLIFFE, residing at Uniontown, in the county of Fayette and State of Pennsylvania, and JOHN H. COWAN, residing at Jefferson, in the county of Ashtabula and State of Ohio, citizens of the United States, have invented a new and useful Safety Attachment for Mine-Elevators, of which the following is a specification.

The invention relates to improvements in safety attachments for mine elevators.

The object of the present invention is to improve the construction of safety attachments for mine elevators, and to provide a simple and comparatively inexpensive apparatus of this construction, capable of being readily installed in mines and adapted to insure safety to persons using the cage of the elevator in going to and returning from their labor within mines, shafts, etc.

A further object of the invention is to provide a safety apparatus of this character having means for preventing the destruction of or injury to property in case the engineer, who occupies a position remote from the cage, should accidentally permit the said cage to exceed its proper limits of travel.

Furthermore, it is the object of the invention to provide a safety attachment for mine elevators capable of cutting off the supply of steam to a steam engine or engines and to simultaneously apply the brake for stopping the hoisting mechanism connected with the cage or cages.

Another object of the invention is to provide means for gradually and positively stopping the cage before the bottom of the elevator is reached, and also to allow the cage to ascend to the passenger landing and to bring the cage to a gradual and positive stop should the cage while carrying passengers be carried upward past the passenger landing.

The invention also has for its object to provide an upper or emergency stop, capable, should the engineer overwind the cable, of effecting a sudden application of the brake to positively stop the elevator cage at once, when the same has exceeded the proper limits of its travel.

A further object of the invention is to provide a switch, adapted, after the cage has been automatically stopped by the safety apparatus, to be operated by hand to relieve the hoisting mechanism of the action of the brake, and capable of automatically closing after such operation, and of effectually preventing the engineer, or other person from interfering with the operation of the safety apparatus by opening the switch, when the cage is at an intermediate point between the bottom of the shaft and the passenger landing.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings: Fig. 3 is a transverse sectional view, taken substantially on the line 3—3 of Fig. 2. Fig. 4 is a detail sectional view, showing the movable trolley of the cage in contact with the lower or main contacts. Fig. 5 is a plan view of the cage partly in section.

Like numerals of reference designate corresponding parts in all the figures of the drawings.

1 and 2 designate reversely movable cages of a mine elevator, which cages operate in vertical guides of a frame-work 1ª of the usual construction. As the safety attachment herein shown and described is applicable to various mine elevators, and as the particular construction of the cages and the means for guiding the same do not constitute a portion of the present invention, a detail description thereof is deemed unnecessary. The cages are alternately raised and lowered in the usual manner by hoisting mechanism consisting of cables 3 and 4 and a pair of drums 5, arranged to receive the cables 3 and 4. The drums 5 are suitably fixed to the shaft 6, but a single drum may be employed, as will be readily understood. The shaft 6, which is journaled in suitable bearings, is designed to be equipped at its ends with cranks (not shown) and to be connected with a pair of engines (not shown), which furnishes the power for operating the hoisting mechanism. The cables 3 and 4 are reversely wound around the drums so that when the shaft is rotated in either direction, one of the cages will be ascending and the other descending.

The steam is conducted to the engines by means of a feed pipe 7, connected with branch pipes 8 by a valve casing 9. The branch pipes 8 lead to the engines (not shown), and the valve casing is provided at a point between the feed pipe 7 and the branches 8 with a valve seat 10, and it contains a valve 11 located above and coöperating with the seat. The steam is introduced into the valve casing at a point above the valve, and the branch pipes extend from the valve casing at a point below the valve, so that the steam from the boiler tends to maintain the valve in its closed position. The valve is provided with a vertical stem 12, extending through the top of the valve casing and connected with one arm of a horizontal actuating lever 13.

The valve may be constructed in any preferred manner, and its casing is preferably equipped with a bracket 14, having an upwardly extending arm 15 and a horizontally projecting arm 16. The arm 15, which extends above the top of the valve, forms a support for the actuating lever 13, which is pivoted at an intermediate point to the arm 15 by means of a pin 17, or other suitable pivot. The outer arm of the lever 13 extends through a bifurcation or opening 18 of a substantially vertical bar or member 19, provided at opposite sides of the bifurcation or opening 18 with slots 20 for the reception of projections 21, extending from opposite sides of the lever 13, whereby the outer arm of the lever is slidably connected with the bar or member 19. The outer end 22 of the lever 13 projects beyond the bar or member 19, and is beveled at its lower side, the upper side forming a shoulder and adapted to be engaged by a catch 23, consisting of a hook, pivoted at its lower end to the lower portion of the bar or member by means of a pin 24, or other suitable fastening device and provided at its upper end with a head 25, having a shoulder adapted to engage the projecting end 22 of the lever 13. The hook-shaped catch is maintained in proper position to engage the outer end of the lever by means of a coiled spring 26, connected with the catch and with the bar or member 19. The lower end of the bar or member 19 is extended below the lower end of the catch, and is pivoted to the upper end of an approximately upright operating lever 27, pivoted at an intermediate point to the outer end of the horizontal arm 16 by a suitable fastening device 28 and having its upper arm curved inwardly. The lower arm of the lever is adapted to be swung outward from the position illustrated in Fig. 16 of the drawings to swing the outer arm of the valve actuating lever 13 downward for opening the valve. The operating lever 27 may be secured in its adjustment by any suitable means, as will be readily understood for holding the steam valve 11 open.

The safety attachment includes an electric circuit 29, in which is arranged a solenoid 30, mounted on the outer arm of the lever and receiving a plunger 31 consisting of inner and outer portions, the outer portion 32 being of non-magnetic material and arranged to engage the upper end of the catch 23, and the inner portion consisting of a core of soft iron, or other suitable magnetic material, adapted to be attracted by the solenoid when the same is excited or energized by the closing of the circuit 29. When the solenoid is energized, the engaging portion of the plunger is moved outward and the lever 13 is disengaged from the catch 23, whereby the steam valve is permitted to close to shut off the steam. The valve is automatically closable when released, and this operation may be effected either through gravity, or any other suitable means, as will be readily understood. When the valve actuating lever 13 is released from the catch, its outer arm swings upward above the catch, which is adapted through the beveled end 22 to automatically reëngage the valve actuating lever, when the lower arm of the operating lever is swung inward to raise the upper arm of the same. After the catch is reëngaged with the valve actuating lever, the latter may be operated to reopen the valve for admitting steam to the engines.

The circuit 29 is equipped with spaced contacts 33 and 34 and similar spaced contacts 35 and 36, located above the passenger landing of the elevator and arranged in the path of the laterally movable trolleys 37 of the cages 1 and 2. Each trolley 37 is provided with a pair of trolley wheels 38, mounted on a horizontal yoke 39, provided with a stem or shank 40 and actuated by a coiled spring 41. The stem will in practice be of such material as to insulate the trolleys from the cage, but any other suitable means may be employed for insulating the cage. The said stem is connected to an arm 42 of a lever 43, pivoted at one end to the cage by a vertical pin or pivot 44, and arranged upon the bottom of the cage. The spring 41, which is of spiral form, is disposed on the stem and is interposed between the yoke and the cage for moving the former outwardly and to hold the trolley wheels in position to engage the said contacts of the electric circuit. The lever 43 is provided at its upper face with a laterally projecting cam flange 45, having a curved edge and extending over the adjacent side 46 of the cage in position to be engaged by the wheels of a car run upon the cage from either end thereof. When the car is run upon the cage, one of the wheels will strike the cam flange and move the trolley inwardly out of the plane of the said contacts, whereby when the elevator is employed for hoisting coal, ore, or other material, the cages will be permitted to pass the contacts of the passenger landing.

In order to enable a brake 47 to be gradually applied through an automatically operable rheostat 48, the contacts 33, 34, 35 and 36 will in practice be fifty feet in length more or less and will extend upward from the passenger landing, so that the brake when automatically applied, will stop the cage gradually and positively before the dumping place is reached. The length of the contacts will of course vary in different mines with the length of the shaft and the speed attained by the cages, as a relatively slow moving cage will not require the same length of contacts as a relatively rapid moving cage.

Figures 1, 16, 17:
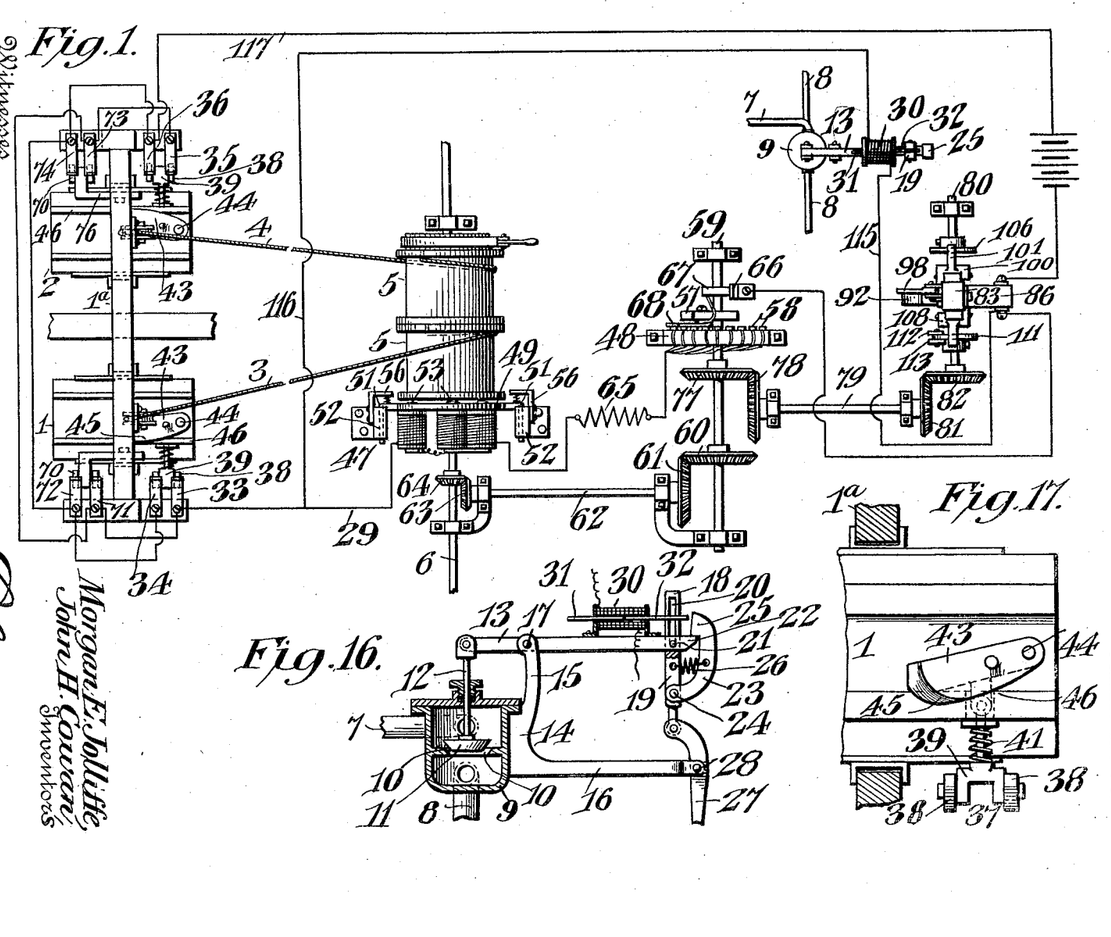
—Figure 1 is a plan view of a safety attachment embodying the invention and shown applied to a mine elevator.
Fig. 16 is a side elevation partly in section, illustrating the construction for cutting off the steam when the brake is applied.
Fig. 17 is an enlarged detail plan view of a portion of the cage, illustrating the construction of the car operated cam lever for moving the trolley inward.
Figure 2:
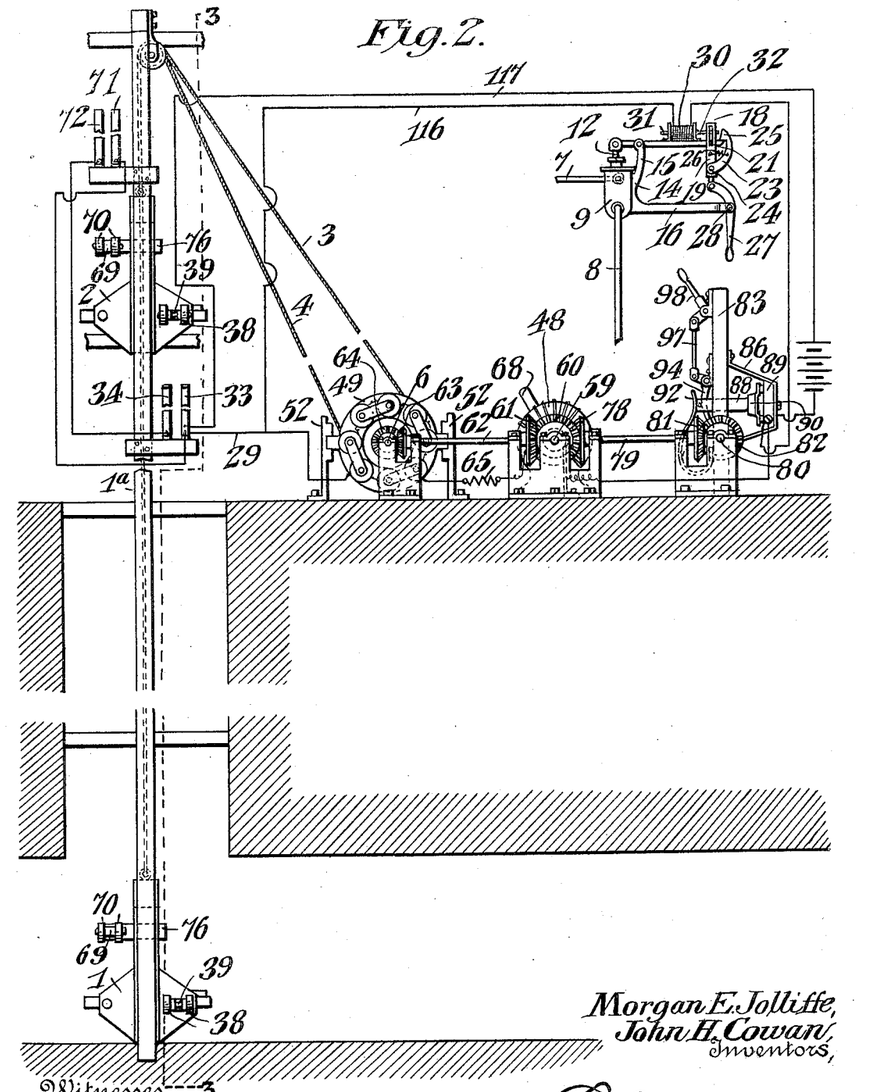
Fig. 2 is a side elevation, the shaft of the mine being elevated in section.
Figures 3, 4, 5:
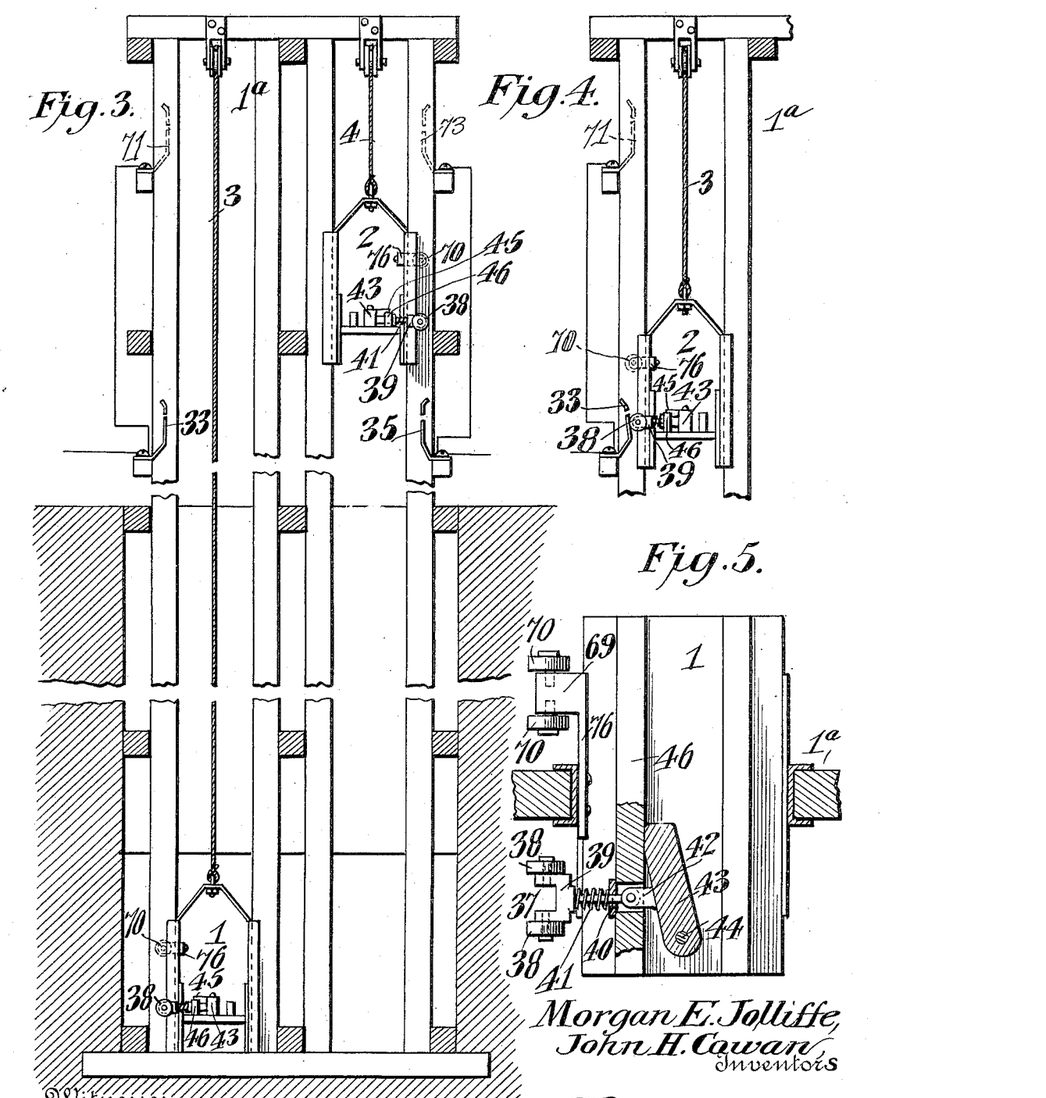
Figure 6:
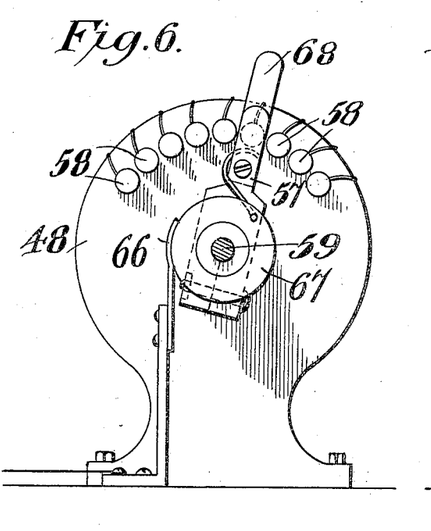
Fig. 6 is a front elevation of the rheostat.
Figure 7:
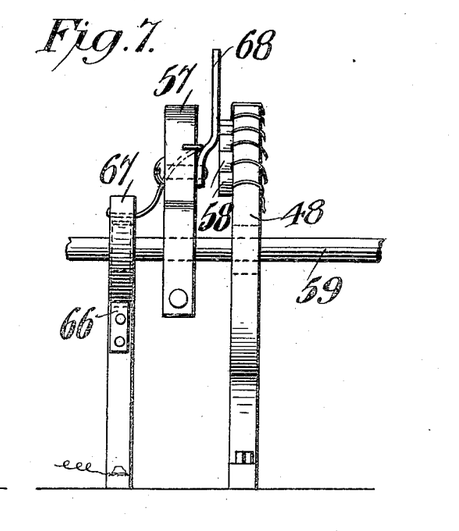
Fig. 7 is a side elevation of the rheostat.
Figure 8:
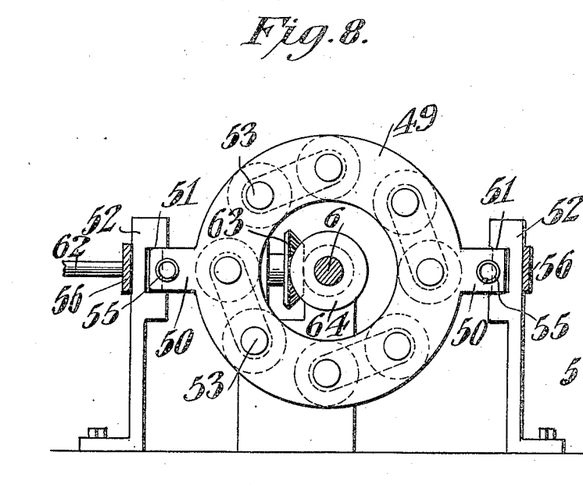
Fig. 8 is an elevation of the electrical brake.
Figure 9:
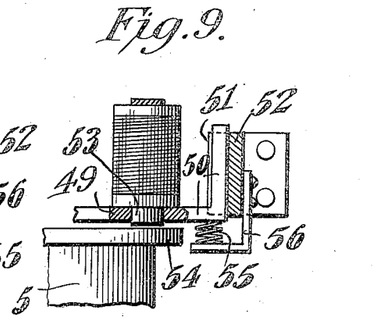
Fig. 9 is a detail sectional view of one side of the same.

The electric brake 47, which is arranged in the circuit, as clearly illustrated in Fig. 1 of the drawings, consists essentially of an annular series of electro-magnets surrounding the shaft 6 and mounted on a yoke 49, having a ring-shaped body portion and provided with horizontally disposed sides or arms 50, slidable in suitable guides or ways 51 of standards 52. The circular or ring-shaped body of the yoke is provided at intervals with apertures through which project the cores 53 of the electro-magnets. The cores are arranged to engage a removable face plate 54 of the outer end of the adjacent drum 5, but any other suitable means may be provided for enabling the brake to operate on the drums 5. When the circuit 29 is open, the brake is maintained out of contact with the drum by means of coiled springs 55, interposed between the yoke of the brake and brackets 56. The brackets 56, which are L-shaped, are mounted on the standards 52, as clearly shown in Figs. 1 and 9 of the drawings, but the springs for holding the brake normally out of engagement with the hoisting mechanism, may be constructed and arranged in any other preferred manner. When the circuit 29 is closed by reason of the trolley 37 engaging the spaced contacts above either passenger landing, the current will pass through the electric brake and the electro-magnets will, through their attraction, frictionally engage the adjacent drum and check and finally stop the rotation of the same. In the accompanying drawings, a conventional brake is illustrated, but it will be readily apparent that any other well known electrically operable brake may be substituted for that shown and described.

In order to prevent a too sudden stopping of the cage and the consequent jar or injury to the passengers, the brake is applied with a gradually increasing force, so that the cage is brought to a standstill without shock. This is effected through the automatically operable rheostat 48, which is equipped with a rotary contact arm 57 and an arcuate series of contacts 58, connected with resistances gradually decreasing from the ends to the center of the series, the highest resistance being at each end of the series and the lowest at the center. The rotary contact arm 57 is mounted on a shaft 59, which makes one revolution during the travel of the cage from the top to the bottom of the shaft, whereby the rotary contact arm maintains a constant relation with the cage, and will always be in proper position to operate on the contacts 58 when the brake is applied. The shaft 59 is journaled in suitable bearings and is connected by bevel gears 60 and 61 with a shaft 62, extending from the said gears 60 and 61 to within a short distance of the shaft 6, and connected with the latter by beveled pinions 63 and 64. The pinions and the gears reduce the speed, so that the shaft 59 makes one revolution while the cage is traveling from the top to the bottom of the shaft. Any other form of gearing, however, may be employed for transmitting motion from the shaft 6 to the rheostat shaft 59, and any necessary number of gears may be employed to secure the proper speed of the rheostat shaft 59 with relation to the shaft 6, so that the said shaft 59 will make but one complete revolution during the travel of the cage from the top to the bottom of the shaft.

In the operation of the elevator, the drum shaft 6 is first rotated in one direction to raise one of the cages and lower the other, and it is then reversed and rotated in the opposite direction to lower the top cage and raise the lower one. This reverse rotary movement of the drum shaft reversely rotates the rheostat shaft; and the arcuate series of the contacts, and their inwardly decreasing resistances will produce a gradual stoppage of the cages when the rheostat shaft is rotating in either direction.

The resistances 65, which are interposed between the arcuate series of the contacts and the electric brake for controlling the strength of the current, may be arranged at any convenient point and are designed to be of the ordinary construction. The rheostat shaft, on which the rotary contact arm 57 is mounted, is suitably insulated. The current flows through the rheostat, a contact brush 66 and a rotary contact element 67 being provided. The rotary contact arm is equipped with a spring 68, or other suitable means for engaging the arcuate series of contacts 58. The details of the rheostat may be varied as desired, the essential feature being the rotary contact arm and the series of the contacts, arranged in the path of the arm and connected with resistances gradually decreasing from the ends of the series of the contacts, so that the brake will be gradually applied when the rotary contact arm is moved from either end of the series of contacts toward the center thereof. The cages are also equipped with a fixed trolley 69, having spaced trolley wheels 70. The fixed trolley, which may be arranged in any convenient position, is preferably located at the opposite end of the cage from the movable trolley and at a point above the plane of the latter. The circuit is provided at each side of the frame-work 1ª of the elevator with upper emergency contacts 71, 72, 73 and 74. These contacts are located at a point above the tipple (not shown) or dumping place, and should the engineer carelessly or accidentally overwind the cable and raise the cage above the tipple or dumping point, the fixed trolley will be carried into engagement with the upper emergency contacts. This will occur while the rotary contact arm is at the central portion of the series of the contacts 58 and will result in an immediate application of the brakes and a sudden and positive stopping of the cage, whereby injury to the frame-work and other property will be effectually prevented. Also the closing of the circuit will cut-off the steam from the engine, and the engineer will at once realize that something is wrong. The fixed trolley, which may be of any preferred construction, is provided with an arm 76, which is secured to the upper portion of the cage at the outer side thereof, but it may be mounted on the cage in any other convenient manner.

The rheostat shaft is connected by bevel gears 77 and 78 with a connecting shaft 79, which communicates motion to a transverse switch-controlling shaft 80. The adjacent ends of the shafts 79 and 80 carry intermeshing bevel gears 81 and 82, and the shaft 80, which is journaled in suitable bearings, extends through a standard or post 83, on which is mounted a switch for throwing off the electric brake from the hoisting mechanism. The switch comprises in its construction a pair of upper and lower contact plates 84 and 85, supported by a bracket 86 and coöperating with a movable switch plate 87, carried into and out of contact with the plates 84 by a slidable bar or member 88. The bracket 86 is approximately U-shaped being composed of inclined upper and lower sides and an intermediate vertical connecting portion and vertical attaching portions, arranged at the terminals of the bracket and secured to the post or standard 83. The contact plates 84 and 85 are mounted on a vertical block or piece 89, preferably constructed of insulating material, and the movable switch plate 87, which is preferably constructed of resilient material, is secured to a block or head 90, constructed of suitable insulating material and mounted on the slidable bar or member 88 at one end thereof. The switch, however, may be constructed in any other preferred manner and is designed to open and close the circuit with a minimum spark.

Figures 10, 11, 12, 13, 14, 15:
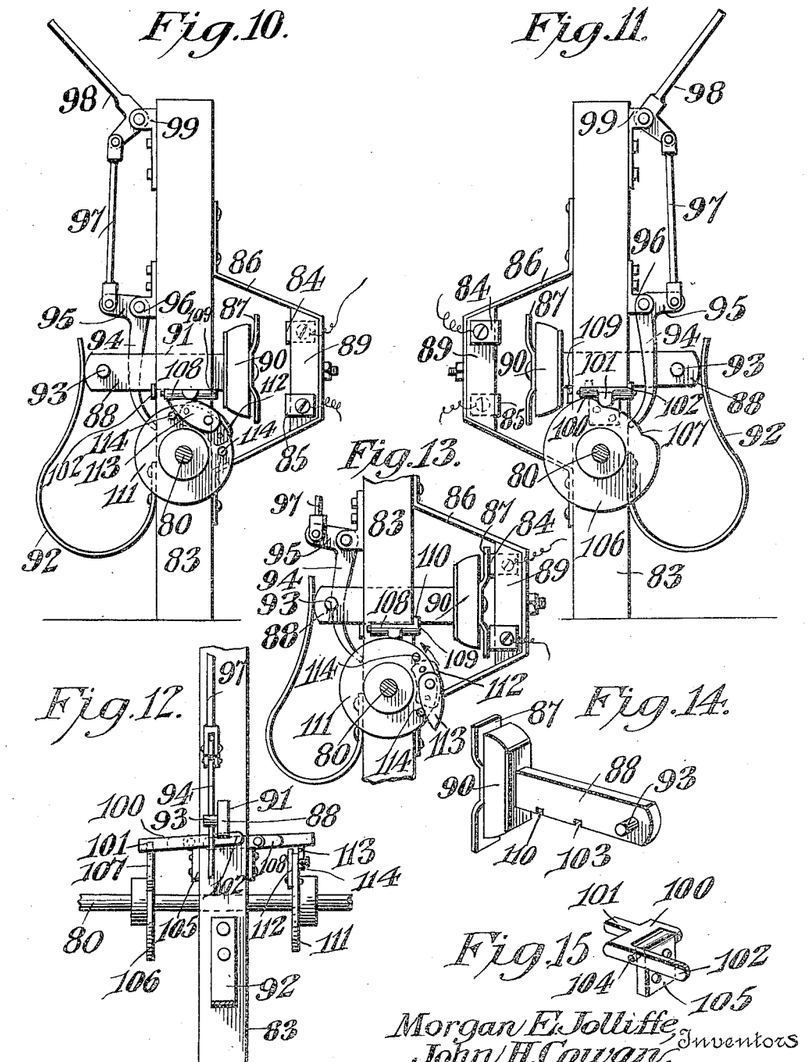
Fig. 10 is a side elevation of the switch and the switch controlling mechanism, illustrating the arrangement of the parts when the switch is open.
Fig. 11 is a similar view, showing the opposite side of the switch, the parts being in the position shown in Fig. 10.
Fig. 12 is an elevation partly in section, illustrating the construction for locking the switch open.
Fig. 13 is an enlarged detail view of the switch, the latter being locked in its closed position.
Fig. 14 is a detail view of the movable member of the switch.
Fig. 15 is a detail view of one of the dogs for engaging the movable member of the switch.

The horizontally disposed bar or member 88 slides in a guide opening 91 of the vertical standard or post 83, and when free to move, it is automatically carried in the direction of the bracket by a spring 92 of sufficient strength to insure a quick positive and automatic closing of the circuit. The spring, which is approximately U-shaped, is secured at one end to the post or standard 83, and its other end is free and bears against the rear end of the slidable bar or member 88. The slidable bar or member is provided at its rear end with a laterally projecting stud 93, arranged to be engaged by a curved arm 94 of a bell crank lever 95, pivotally mounted in a bracket 96. The bracket is secured to the post or standard 83, and the arm 94 extends downward from the bracket and presents a convex face to the stud to facilitate actuating the slidable bar or member 88. The other arm of the bell crank actuating lever 95 is relatively short and is arranged horizontally, and is connected by a link or rod 97 with an L-shaped hand lever 98. The L-shaped hand lever is pivotally mounted at its angle in a bracket 99, which is secured to the post or standard 83 at the upper end thereof, and the hand lever extends above the said post or upright and is adapted to be oscillated by the engineer to move the slidable bar or member 88 rearwardly for breaking the circuit and thereby relieving the hoisting mechanism from the action of the electrical brake. When the slidable bar or member 88 is moved rearwardly to open the switch, it is automatically engaged by a setting dog 100, consisting of a substantially Y-shaped lever provided with an outwardly extending stem 101 and having one of its sides 102 extended beneath the rear portion of the slidable bar or member 88. The slidable bar or member 88 is provided at its lower edge with a rear notch 103, which is automatically engaged by the setting dog, when the slidable bar or member 88 is moved rearward for locking the switch open, provided of course that the setting dog is free to move. The setting dog is pivoted by a pin 104 to an attaching plate 105, which is secured to one of the side faces of the post or standard 83. The pin 104 passes through the sides of the dog and the upper end of the attaching plate, which fits within the setting dog, as clearly shown in Fig. 15 of the drawings. The weight of the stem and the transverse portion of the setting dog is sufficient to automatically actuate the latter to carry the extended arm 102 into engagement with the slidable bar or member.

The shaft carries a tripping disk 106, forming a cam and arranged to engage and lift the stem of the setting dog to release the slidable bar or member for permitting the switch to be automatically closed by the spring 92. The tripping disk 106 is cutaway to form a recess 107, which in practice is of sufficient length to permit the disk 106 to clear the stem, while the movable trolley is traveling along the lower flexible or resilient contacts of the passenger landing. This is for the purpose of enabling the relatively movable trolley of the cage, after the brake has been automatically applied and released by the engineer, to clear the said contacts and prevent a second application of the brake before the relatively movable trolley has left the said contacts. As soon as the cage by its downward movement carries the trolley 37 beyond the contacts of the passenger landing, the tripping device will through its rotation engage the setting dog and automatically release the slidable bar, which will then be actuated by the spring 92 for automatically closing the switch. The uncut peripheral edge of the setting disk will maintain the setting dog out of engagement with the slidable bar or member and will prevent the dog from reëngaging the bar or member until the disk, through its rotation, carries the recesses 107 in position to receive the stem of the setting dog 100.

As soon as the switch is automatically closed by the action of the tripping cam or disk 106, it is automatically locked by a dog 108 of substantially Y-shape and constructed similar to the setting dog heretofore described. The locking dog 108 has an extended side or arm 109, which engages a front notch 110 of the slidable bar or member 88, whereby the switch is positively locked closed during the travel of the cages between the contacts of the passenger landing and the bottom of the shaft. This will prevent the engineer, or any other person from interfering with the operation of the automatic safety attachment. In practice, the switch mechanism with its controlling means and the rheostat and other parts of the safety apparatus are designed to be incased and locked to prevent any interference with the operation of the attachment.

As the ascending cage approaches the passenger landing, the locking dog is disengaged from the slidable bar or member 88 by means of a rotary releasing cam, consisting of a disk 111, and a projecting plate 112 detachably mounted on the disk and extending beyond the periphery thereof and presenting an outer curved edge for engaging and lifting the outwardly extending stem of the locking dog. The projecting peripherally arranged plate 112 is removable for the purpose of permitting plates of various sizes to be mounted on the rotary disk for enabling the unlocking of the slidable bar or member to be effected at the desired point in the travel of the cages. The cam plate is also designed to be of sufficient length to maintain the locking dog out of engagement with the slidable bar or member during the travel of the cage from the passenger landing contacts to the upper emergency landing contacts. In order that, should the engineer in starting the cage raise the same from the passenger landing instead of moving the cage in the opposite direction, the locking dog will remain out of operation until the brake has been again applied and the cage stopped through the closing of the circuit by the engagement of the relatively fixed trolley with the upper emergency contacts. This construction, which prevents an accident through overwinding of the cable, permits the engineer to open the switch by hand and lower the cage. The releasing disk is equipped with an automatically operable safety acting extension cam plate 113, pivoted at one end centrally of the removable cam plate and adapted to project alternately from opposite ends of the same. The pivoted cam plate is supported in its projecting position by a stud 114, projecting laterally from the face of the disk on which the movable cam plate 113 is mounted. The pivoted cam plate is tapered at its outer end and, when through the rotary movement of the releasing disk, it is carried to the bottom of the latter, it assumes a vertical position and when it is carried upward it will with relation to the direction of the movement of the fixed cam plate project from the rear end of the same. A stop 114 is located at each side of the pivot to support the movable cam member in either position. The projecting pivotally mounted cam plate or member 113 maintains the locking dog out of engagement with the slidable member after the cam plate 112 has lifted the stem of the said locking dog.

The current, which may be obtained from any source of supply, flows through the switch then through the rheostat with its resistances and then through any pair of contacts, which may be employed by the trolley of the cages. The positive contacts 33, 71, 73 and 35 are connected together. The negative contacts 34, 72, 74 and 36 are also connected together. When the members of any one of the sets of contacts are connected, the circuit will be closed. The solenoid 30 is connected with the circuit by wires 115 and 116, connected, respectively, with the circuit with the negative contact of the switch and with the wire or other conductor extending from the brake to the contact 33. By this arrangement, the plunger 31 will be operated as soon as the circuit is closed. The solenoid, however, may be connected with the circuit at any other convenient points, as will be readily understood. The said negative contacts 34, 72, 74 and 36 are connected with the source of supply by a return wire or conductor 117 and completes the circuit.

When the elevator is used for hoisting coal, or other material and not as a passenger elevator, the movable trolleys will be arranged out of the plane of the contacts of the passenger landing, and the brake will be operated only when the engineer accidentally overwinds the cable. This will prevent injury to the mine equipment. When the apparatus is employed as a passenger elevator, the laterally movable trolleys extend into the path of the contacts at the passenger landing, and the cages will be automatically and gradually stopped, the ascending cage operating to close the circuit and apply the brake.

Having thus fully described our invention, what we claim as new and desire to secure by Letters Patent, is:—

1. In an automatic safety attachment for mines, the combination with a cage, and hoisting mechanism for raising and lowering the cage, of a circuit including circuit closing means, one member of which is carried by the cage and arranged to automatically close the circuit, means carried by the cage and arranged to be actuated by a car for moving the said member of the circuit closing means to an inoperative position to prevent the circuit from being closed by such member, and an electrically operable brake arranged in the circuit for stopping the hoisting mechanism.

2. In an automatic safety attachment for mines, the combination with a cage, and hoisting mechanism for raising and lowering the cage, of a circuit including circuit closing means comprising a member carried by the cage and normally arranged to automatically close the circuit and movable inwardly and outwardly to and from its operative position, mechanism carried by the cage and connected with the said movable member and arranged to be actuated by a car to move the member to an inoperative position, and an electrically operable brake arranged in the circuit for stopping the hoisting mechanism.

3. In an automatic safety attachment for mines, the combination with a cage, and hoisting mechanism for raising and lowering the cage, of a circuit including circuit closing means comprising a member carried by the cage and movable inwardly and outwardly to and from an operative position, mechanism carried by the cage and connected with the said movable member and arranged to be actuated by a car to move the member to an inoperative position, means for automatically carrying the said member to its operative position when it is free to move, and an electrically operable brake arranged in the circuit for stopping the hoisting mechanism.

4. In an automatic safety attachment for mines, the combination with a cage, and hoisting mechanism for raising and lowering the cage, of a circuit including circuit closing means comprising a member carried by the cage and movable inwardly and outwardly to and from an operative position, a lever pivotally mounted on the cage and connected with the said member and arranged to be actuated by a car for moving the said member to an inoperative position, and an electrically operable brake arranged in the circuit for stopping the hoisting mechanism.

5. In an automatic safety attachment for mines, the combination with a cage, and hoisting mechanism for raising and lowering the cage, of a circuit including circuit closing means comprising a member carried by the cage and movable inwardly and outwardly to and from an operative position, a pivoted lever carried by the cage and having a cam portion arranged to be engaged by a car for moving the said member to an inoperative position, a spring for automatically moving the member outwardly to an operative position, and an electrically operable brake arranged in the circuit for stopping the hoisting mechanism.

6. In an automatic safety attachment for mines, the combination with a cage, and hoisting mechanism for raising and lowering the cage, of a circuit including circuit closing means comprising a trolley movably mounted on the cage and having spaced trolley wheels, a spring for holding the trolley in position for closing the circuit, a lever carried by the cage and connected with the trolley, said lever being arranged to be actuated by a car for carrying the trolley to an inoperative position, and an electrically operable brake arranged in the circuit for stopping the hoisting mechanism.

7. In an automatic safety attachment for mines, the combination with a cage, and hoisting mechanism for raising and lowering the cage, of a circuit provided with circuit closing means including upper and lower contacts, a trolley movable into and out of the plane of the lower contacts, a relatively fixed trolley arranged in the plane of the upper contacts, and an electrically operable brake arranged in the circuit for stopping the hoisting mechanism.

8. In an automatic safety attachment for mines, the combination with a cage, and hoisting mechanism for raising and lowering the cage, of a circuit provided with circuit closing means including upper and lower contacts, a trolley movable into and out of the plane of the lower contacts, a relatively fixed trolley arranged in the plane of the upper contacts, means operable by a car for carrying the relatively movable trolley out of the plane of the lower contacts when a car is run onto the cage, and an electrically operable brake arranged in the circuit for stopping the hoisting mechanism.

9. In an automatic safety attachment for mines, the combination with an elevator including reversely movable cages, and hoisting mechanism for raising and lowering the cages, of a circuit including lower and upper emergency contacts located, respectively, at the passenger landing and at the upper limit of the travel of the cages, fixed trolleys mounted on the cages and arranged in the plane of the upper contacts for closing the circuit when the cages are at the limit of their travel, a movable trolley also carried by each cage and normally arranged in the plane of the lower contacts, said movable trolley being adapted to be withdrawn from such position to permit the cage to pass the lower contacts without closing the circuit, and an electrically operable brake arranged in the circuit for stopping the hoisting mechanism.

10. In an automatic safety attachment for mines, the combination with a cage, and hoisting mechanism for raising and lowering the same, of a circuit including circuit closing means comprising a member carried by the cage, a steam supply pipe having a valve, and electrically operated mechanism arranged in the circuit for closing the valve to cut off the steam when the circuit is closed.

11. In an automatic safety attachment for mines, the combination with a cage, and hoisting mechanism for raising and lowering the cage, of a circuit including circuit closing means comprising a member carried by the cage, a steam supply pipe provided with a valve, mechanism for holding the valve open, and a solenoid arranged in the circuit and having a plunger for tripping the said mechanism to close the valve.

12. In an automatic safety attachment for mines, the combination with a cage, and hoisting mechanism for raising and lowering the cage, of a circuit including circuit closing means comprising a member carried by the cage, a steam supply pipe having an automatically closable valve, an operating lever, a catch for coupling the operating lever with the valve, and a solenoid arranged in the said circuit and having a plunger for operating the catch to disconnect the valve from the lever to permit the said valve to close automatically.

13. In an automatic safety attachment for mines, the combination with a cage, and hoisting mechanism for raising and lowering the cage, of a circuit including circuit closing means comprising a member carried by the cage, a steam supply pipe provided with a valve, a lever connected with the valve for operating the same, an operating lever, a catch for connecting the operating lever with the valve actuating lever, and a solenoid arranged in the circuit and having a plunger for moving the catch out of engagement with the valve actuating lever.

14. In an automatic safety attachment for mines, the combination with a cage, and hoisting mechanism for raising and lowering the cage, of a circuit including circuit closing means comprising a member carried by the cage, a steam supply pipe provided with a valve, a valve actuating lever connected with the valve, an operating lever, a link connected with the operating lever, a catch mounted on the link and arranged to engage the valve actuating lever, and a solenoid arranged in the circuit and having a plunger for throwing the catch out of engagement with the valve actuating lever.

15. In an automatic safety attachment for mines, the combination with a cage, and hoisting mechanism for raising and lowering the cage, of a circuit including circuit closing means comprising a member carried by the cage, a steam supply pipe provided with a valve, a valve actuating lever connected with the valve, an operating lever, a link pivoted to the operating lever and having an opening to receive the valve actuating lever and slidably connected with the latter, a pivoted spring actuated catch mounted on the link and arranged to engage the valve actuating lever, and a solenoid arranged in the circuit and mounted on the valve actuating lever and provided with a plunger for throwing the catch out of engagement with the said valve actuating lever.

16. In an automatic safety attachment for mines, the combination with a cage, and hoisting mechanism for raising and lowering the cage, of a circuit including circuit closing means comprising a member carried by the cage, a steam supply pipe provided with a valve, a valve actuating lever connected with the valve and having a beveled end, an operating lever, a link pivoted to the operating lever and slidably connected with the valve actuating lever, a catch pivoted to the link and provided with a head arranged to engage the beveled end of the valve actuating lever, a spring for holding the catch in position for engaging the valve actuating lever, and a solenoid arranged in the circuit and having a plunger for throwing the catch out of engagement with the valve actuating lever.

17. In an automatic safety attachment for mines, the combination with a cage, and hoisting mechanism for raising and lowering the cage, of a circuit including circuit closing means comprising a member carried by the cage, an electrically operable brake arranged in the circuit for stopping the hoisting mechanism, a steam supply pipe having a valve, and electrically operated mechanism also arranged in the circuit for closing the valve to cut off the steam.

18. In an automatic safety attachment for mines, the combination with a cage, and hoisting mechanism for raising and lowering the cage, of a circuit including means carried by the cage for closing the circuit, an electrically operable brake arranged in the circuit for stopping the hoisting mechanism, and a rheostat also arranged in the circuit and having a contact arm connected with and actuated by the hoisting mechanism for applying the brake with a gradually increasing force to gradually stop the cage.

19. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, and a rheostat also arranged in the circuit and including a rotary contact arm, and a series of resistances gradually decreasing from the ends to the center of the series to effect a gradual application of the brake.

20. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, and a rheostat including a rotary contact arm connected with and actuated by the hoisting mechanism, a series of contacts arranged in the path thereof, and a series of resistances connected with the contacts and gradually decreasing from the ends to the center of the series to effect a gradual application of the brake when the arm is moving over the series of contacts from either end thereof.

21. In an automatic safety attachment for mines, the combination with a cage, and hoisting mechanism for raising and lowering the cage including a drum, a circuit, means carried by the cage for closing the circuit, an electrically operable brake arranged in the circuit for stopping the rotary movement of the drum, a rheostat also arranged in the circuit and including a rotary arm, an arcuate series of contacts arranged in the path of the arm, resistances also connected with the contacts and decreasing from the ends to the center of the series, and gearing for connecting the contact arm with the drum.

22. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, a manually operable switch for opening the circuit to relieve the hoisting mechanism of the brake, means for automatically holding the switch in its open position, and means for automatically tripping the switch to close the same.

23. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, a manually operable switch for opening the circuit to relieve the hoisting mechanism of the brake, means for automatically holding the switch in its open position, means for automatically tripping the switch to close the same, and a locking device for holding the switch in its closed position.

24. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, a manually operable switch for opening the circuit to relieve the hoisting mechanism of the brake, means for automatically holding the switch in its open position, means for automatically tripping the switch to close the same, a locking device for holding the switch in its closed position, and means for automatically unlocking the switch to permit the same to be opened by hand.

25. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, a manually operable switch for opening the circuit to relieve the hoisting mechanism of the brake, a locking device for holding the switch closed, and means automatically operable by the hoisting mechanism for unlocking the switch to permit the same to be opened by hand.

26. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, a manually operable switch for opening the circuit to relieve the hoisting mechanism of the brake, a locking device for holding the switch in its open position, a rotary cam connected with and actuated by the hoisting mechanism and arranged to operate the locking device to trip the switch, and means for automatically closing the switch when the same is released.

27. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, a manually operable switch for opening the circuit to relieve the hoisting mechanism of the brake, a locking device for holding the switch in its open position, a rotary cam connected with and actuated by the hoisting mechanism and arranged to operate the locking device to trip the switch, said cam being provided with a recess or cut-away portion to permit a limited movement of the cage while the switch is open, and means for automatically closing the switch when the same is released.

28. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, a manually operable switch, a locking device for holding the switch in its closed position, and a cam connected with and actuated by the hoisting mechanism for automatically releasing the switch for enabling the same to be opened by hand.

29. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, a manually operable switch, a locking device for holding the switch in its closed position, and a cam connected with and actuated by the hoisting mechanism and provided with a removable cam plate arranged to engage the locking device to release the switch.

30. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, a manually operable switch, a locking device for holding the switch in its closed position, and a rotary cam provided with a pivoted automatically operable gravity member arranged to alternately project in opposite directions and adapted to hold the locking device out of engagement with the switch.

31. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, a manually operable switch, a locking device for holding the switch in its closed position, and a cam connected with and actuated by the hoisting mechanism and including a rotary member, a plate mounted on and projecting from the rotary member, a movable cam member pivoted centrally with relation to the plate and adapted to extend beyond either end of the same to form a continuation thereof, and opposite supports mounted on the rotary member and arranged to receive the pivoted cam member.

32. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, a manually operable switch for opening the circuit, a pivoted gravity dog arranged to engage the switch for holding the same open, and a rotary cam actuated by the hoisting mechanism and arranged to swing the dog out of engagement with the switch.

33. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, a switch including a movable member, a hand lever, and a bell crank lever connected with the hand lever and having an arm arranged to engage the said member to open the switch.

34. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, a switch having a slidable member, a spring engaging the slidable member for automatically closing the switch, a bell crank lever arranged to actuate the slidable member for opening the switch, and a hand lever connected with the bell crank lever for operating the same.

35. In an automatic safety attachment for mines, the combination with a cage, and hoisting mechanism for raising and lowering the cage, of a circuit, means carried by the cage for closing the circuit, an electrically operable brake arranged in the circuit for stopping the hoisting mechanism, a switch provided with a horizontally slidable member, pivoted dogs arranged to engage the slidable member for locking the switch open and closed, rotary cams actuated by the hoisting mechanism for operating the dogs to release the slidable member, a spring engaging the slidable member for automatically closing the same, and manually operable means for sliding the member to open the switch.

36. In an automatic safety attachment for mines, the combination with a cage, and hoisting mechanism for raising and lowering the same, of a steam supply pipe having an automatically closable valve, a lever, mechanical means for detachably connecting the lever with the valve, and electrically operable means for automatically disconnecting the valve from the lever to permit the former to close.

37. In an automatic safety attachment for mines, the combination with a cage, and hoisting mechanism for raising and lowering the cage, of a circuit including circuit closing means, one member of which is carried by the cage for automatically closing the circuit, said member being thrown to an inoperative position by movement of a car onto the cage, and an electrically operable brake arranged in the circuit for stopping the hoisting mechanism.

38. In an automatic safety attachment for mines, the combination with a cage, and hoisting mechanism for raising and lowering the cage, of a circuit including two independent circuit closing members, one of which is operable by the movement of the car onto the cage to carry it to an inoperative position, and the other being operable by the movement of the cage beyond its normal limit, and an electrically operable brake arranged in the circuit for stopping the hoisting mechanism.

39. In an automatic safety attachment for mines, the combination with a cage, and hoisting mechanism for raising and lowering the cage, of a circuit including circuit closing means comprising a member carried by the cage, and upper contacts located in the path of the said member and arranged beyond the normal limit of the movement of the cage for closing the circuit when the cage is moved beyond such normal limit, and an electrically operable brake arranged in the circuit for stopping the hoisting mechanism.

40. In an automatic safety attachment for mines, the combination with a cage, and hoisting mechanism including a cable connected with the cage, and a hoisting drum, of an electrically operable brake for the drum, a circuit connected with the brake and including circuit closing means operable by the movement of the cage, and means for applying the brake with gradually increasing force so as to gradually stop the cage.

41. In an automatic safety attachment for mines, the combination with a cage, and hoisting mechanism for raising and lowering the same, of a circuit including circuit closing means operable by the movement of the cage, an electrically operable brake arranged in the circuit for stopping the hoisting mechanism, a steam supply pipe having a valve, and electrically operated mechanism also arranged in the circuit for closing the valve to cut off the steam.

In testimony, that we claim the foregoing as our own, we have hereto affixed our signatures in the presence of two witnesses.

MORGAN EVAN JOLLIFFE.
JOHN H. COWAN.

Witnesses:
GEORGE E. SUTTON,
WILLIAM J. BEYGE.